Oct. 11, 1960 A. G. THOMAS 2,955,692
MAGNETIC CLUTCH
Filed Nov. 24, 1958
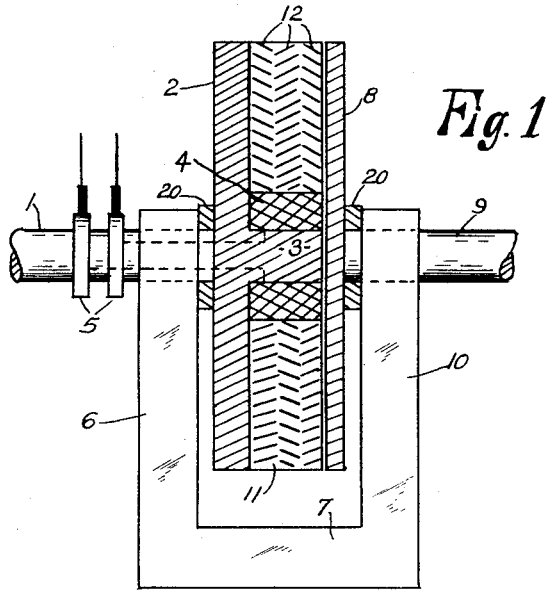
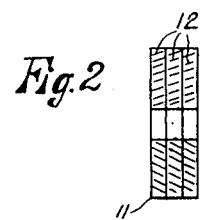
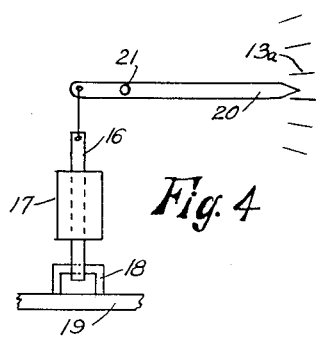
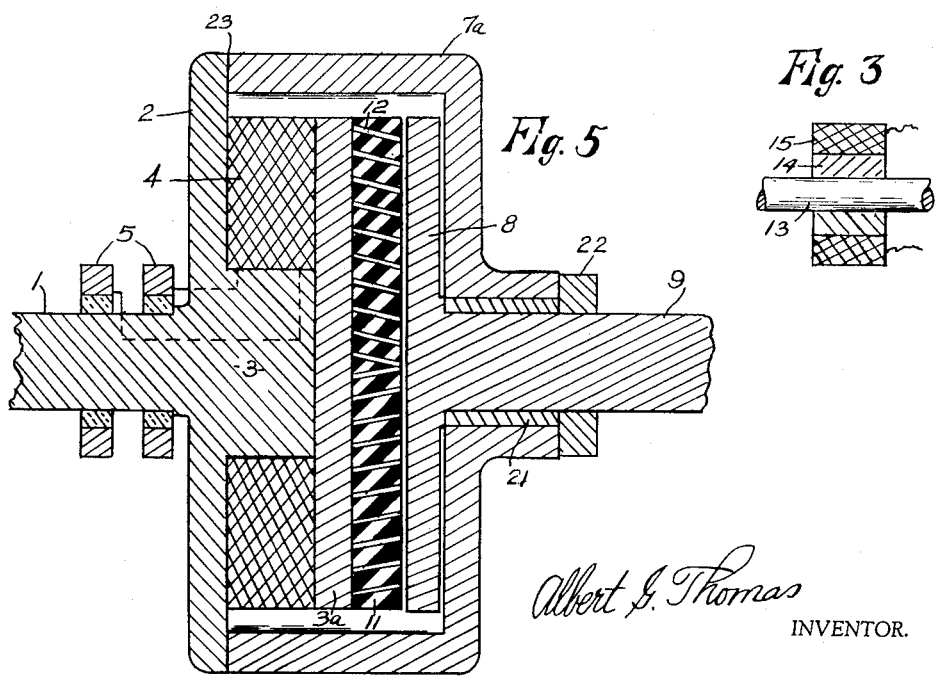
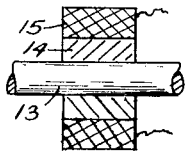
Albert J. Thomas
INVENTOR.

United States Patent Office 2,955,692
Patented Oct. 11, 1960

2,955,692

MAGNETIC CLUTCH

Albert G. Thomas, 133 Bollingwood Road,
Charlottesville, Va.

Filed Nov. 24, 1958, Ser. No. 775,920

11 Claims. (Cl. 192—84)

This invention relates to clutches and especially to magnetic clutches. This application is a continuation-in-part of my co-pending application, Serial No. 215,932, filed March 3, 1951, now Patent No. 2,921,479, granted January 19, 1960.

Clutches are widely used in military and commercial devices of various kinds. Many different types of clutches have been devised for different conditions and purposes. One clutch developed a few years ago employed iron particles in oil in order to provide fast clutching and declutching action when the particles are magnetized. This type of clutch has caused much trouble, however, due to agglomeration of the particles, leakage of fluid, heating, and the like.

It is an object in the present invention, to provide a magnetic clutch which can be very rapidly clutched and de-clutched and which may be made in any size.

Another object is to provide a magnetic clutch in which magnetic particles, wires, or rods are imbedded in resilient material to provide considerable movement but without any danger of agglomeration or bunching.

A further object is to provide a fast-acting magnetic clutch without any liquid which may leak.

An additional object is to provide a magnetic clutch which can be made without undue difficulty.

Another object is to provide a novel type of magnetic brake.

A still further object is to provide a device for changing a dimension of an element by means of a magnetic field.

Other objects will be evident in the following description.

In the drawings:

Figure 1 shows a magnetic clutch in semi-section.

Figure 2 is a sectional elevation of a modified resilient clutch material having imbedded iron particles or elements.

Figure 3 is a part sectional view of a magnetic brake or similar device.

Figure 4 is an elevation of a meter or other device incorporating an element which changes in dimension under the influence of a magnetic field.

Figure 5 is a sectional elevation of a practical form of the clutch shown in Figure 1.

In Figure 1 the driving shaft 1 of the magnetic clutch is attached coaxially to iron or steel disc 2 having good magnetic permeability and having an integral or attached iron or steel cylindrical core element 3 projecting therefrom. Magnetizing winding 4 surrounds core 3 and is electrically connected with insulated slip rings 5 on shaft 1. Each of these rings is connected with a terminal of winding 4 by a wire passing through a channel in shaft 1 which is rotatably mounted in bearing post 6 extending from base element 7. A suitable pulley or other means on shaft 1 can be used to drive it. Washers 20 and members 6, 7, and 10 may be of material of good magnetic permeability if desired.

Driven disc 8 is made of iron or steel of good magnetic permeability and may be relatively thin if quick acceleration or deceleration of the driven element is desired. This disc is attached coaxially to shaft 9 which is rotatable in bearing post 10 also extending from base element 7. If desired, driven shaft 9 may be allowed axial play through a key or otherwise, sufficient to bring disc 8 into contact with annular ring of resilient or other material 11 which is bonded, cemented, or riveted to disc 2, and to the casing of winding 4 if desired. This composite material comprises rubber, synthetic rubber, plastic, or other relatively soft or expansible material admixed with layers 12 of elongated iron or steel filings, wire pieces, or the like, aligned so that when magnetic flux traverses element 11 in axial direction the particles will tend to swing into parallel alignment, parallel with the flux, and in so doing will expand the resilient or other soft material around them, in axial direction. Upon cessation of the flux the natural resiliency of the material holding the particles will cause it to shorten in axial direction. Any suitable arrangement of the particles 12 can be made, as long as they tend to expand the surrounding material when flux produced by winding 4 circulates through core 3 and from disc to disc through material 11. The particles may be aligned as indicated in Figure 2, and element 11 may comprise a plurality of annular rings of resilient material, each ring having particles aligned in the same sense, for that ring.

It is obvious that the particles could be aligned in such way that the resilient material would be pinched together when the flux traverses the composite material, or that flux in one direction would cause a shortening of the material due to movement of particles, whereas flux in another direction would cause lengthening of the composite material. Furthermore, normally, lengthening of resilient material in one direction concomitantly causes shortening of the material in another direction.

In operation, if shaft 1 is rotated by a suitable source of power, disc 8 will normally not be rotated so that shaft 9 will remain stationary. If, however, winding 4 is energized by direct current, preferably, supplied from a suitable source through slip rings 5 and associated brushes, then the flux developed in annular ring of material 11 will cause this material quickly to expand so that it makes contact with plate 8 which then is rotated as a result of friction with expanded material 11 and also as a result of magnetic locking action with the particles 12, especially if these particles are in actual contact with disc 8. The working face of disc 8 may be smooth or it may have a large number of dimples or recesses of any kind to allow better locking engagement with the resilient or expansible material. If disc 8 and shaft 9 are allowed axial movement, the magnetic flux will attract the disc powerfully against material 11. This axial movement is not essential to the operation of the device, however. Upon de-energization of winding 4 the flux quickly ceases and disc 8 is released to become stationary again. Particles 12 may be anchored in elastic material of element 11 and may be magnetically pulled into contact with disc 8 to produce magnetic locking action. The return magnetic circuit is supplied by elements 6, 7, and 10 which may be of iron or steel.

The expansible, or compressible, magnetic material shown, as well as similar material using the same general principles, although the specific alignment of particles may be different, can be used with many other devices than magnetic clutches. For instance, in Figure 3 shaft 13 is surrounded by collar 14 of rubber or other expansible or contractible material having aligned iron particles admixed therewith. Therefore when current traverses magnetizing winding 15, attached collar 14 will expand inward to lock shaft 13 against movement, or will contract to release the shaft, according to the arrangement of the particles and the flux. Similarly, in Figure 4, rod 16 of resilient material and admixed iron or other magnetizable particles is surrounded by magnetizing winding 17 suitably supported and having an axial opening therein, and rod 16 will be changed in length when the winding is energized. The movement of rod 16 can be used to operate indicators for current meters, for operating relay contacts or for any other purpose for which a solenoid may be used. The lower end of rod 16 is shown attached to anchor 18 which is fastened to a base 19 shown in fragmentary manner. The pointer 20, pivoted at 21 to a suitable support, is movable over scale 13a.

Figure 5 shows a practical form of the clutch of Figure 1 which illustrates general principles. In most practical magnetic devices it is well known that it is desirable to provide a return magnetic path for the field in order to produce a strong field. Figure 5 shows details of a device similar to the disclosure of Figure 1. In Figure 5, like parts are given like numerals as in Figure 1. In Figure 1 a return magnetic path is provided by legs 6 and 10 and integral member 7 but more flux is produced by a given winding if the magnetic flux path can travel through a circular cup-like member 7a which is the equivalent of member 6—7—10 of Figure 1.

The rubber or other resilient material 11 has iron or steel rods 12 imbedded in the rubber and aligned at an angle or angles with respect to the axis of the clutch. Iron or steel disc 3a may be attached to the face of core 3 and the winding 4 may be placed in the annular space between magnetizable disc 2 and disc 3a. Disc 3a is not essential however. Disc 2 may be integral with shaft 1 or attached to it. Heavy cup-like iron or steel member 7a is equipped with relatively long bearing 21 in which shaft 9 is rotatable as described in connection with Figure 1. This shaft may have attached collar 22, if desired, to limit leftward axial movement of the shaft. Magnetizable iron or steel disc 8 may be integral with or attached to shaft 9 and preferably is arranged adjacent the annular inner surface of member 7a, with a small air gap therebetween. The annular edge 23 of element 7a is preferably attached to disc 2 by screws to provide a good magnetic path. The rubber or other resilient disc 11 having imbedded skewed iron or steel rods 12 is cemented, screwed, or otherwise fastened to disc 3a or to coil 4 if disc 3a is not used.

The operation of this clutch is the same as described in connection with Figure 1. Preferably, direct current is supplied to annular winding 4 through connected slip rings 5 and associated brushes not shown. This results in a magnetic field traversing core 3, disc 3a, rods 12, disc 8, member 7a, and back to the core 3 through disc 2. When this happens the magnetic force twists or rotates elements 12 to positions more nearly parallel with the axially directed flux and so material 11 is twisted in such a way that it expands axially, thereby quickly engaging disc 8 to drive it and shaft 9 through friction.

As stated in the description of Figure 1, the rods 12 may be brought into actual contact with the adjacent surface of disc 8 in which case there will be a tight driving action due to the magnetic attraction between the rods and the disc. The rods may also touch disc 3a in which case there will be little reluctance in the rod assembly, especially if there are many rods closely spaced. There can be also an additional locking action due to the toggle effect of the rods being brought into contact with the driving and driven magnetic discs at a locking angle or angles. The angle can be so chosen that the latter effect will be present or absent, as desired.

The torque or degree of slip of the clutch can be regulated by the strength of current supplied winding 4. A very light driving action can be provided, with much slip, or a magnetically locked and frictionally locked condition can be achieved by strengthening the current. Upon deenergization of winding 4 the resiliency of material 11 quickly returns rods 12 to declutched position so that disc 8 and shaft 9 will not be rotated. The magnetic flux could be passed through bearing 21 if desired, as in Figure 1. It is desirable, however, to pass the flux around the bearing, which would be the case in Figure 5, for the most part. Shafts 1 and 9 may be mounted in main supporting bearings, not shown. It is obvious that a magnetic brake as described in connection with Figure 3 could be used to stop rotation of shaft 9 after deenergizing winding 4.

The magnetic clutch described in this disclosure can be used in servo-systems, guided missiles, automatic controls, tape drives, machine tools, variable ratio drives, and in many applications in which clutches have been used. It has the advantages of ease of manufacture, very rapid clutching and declutching action, good regulation of driving torque, lack of liquid to leak, no bunching of particles, and it may be made in very small, intermediate, or in large sizes. The rods may be arranged in slanting pattern and liquid or melted rubber poured between them or they may be punched into the rubber or otherwise fabricated. It is not essential to use an electromagnet as a permanent magnet may be used, the field from this magnet being made to cause clutching or declutching action by closing or opening a gap in the magnetic circuit by means of a soft iron member.

What I claim is:

1. In a power transmission device, driving means, driven means, integral resilient material between said driving and driven means and containing a plurality of spaced layers of magnetizable elements aligned to cause expansion of said material in at least one direction when said elements are magnetized, and means for magnetizing said elements to produce driving action between said driving and driven means.

2. In a power transmission device, a magnetizable driving plate, a magnetizable core extending therefrom, a magnetizing winding surrounding said core, a resilient member surrounding said winding and containing a plurality of magnetizable elements aligned at a substantially uniform angle relative to the axis of said device to cause expansion of said resilient member when said elements are magnetized, a driven plate of magnetizable material adjacent said resilient member which is also adjacent said driving plate, means for magnetizing said plates and said elements, and shafts extending from said plates.

3. In a power transmission device, driving means, driven means, resilient material intermediate said driving and driven means and containing a plurality of elongated magnetizable elements having their long axes normally angularly disposed with relation to the axis of said driving and driven means, and means for producing a magnetic field substantially parallel with said axis and traversing said material and magnetizable elements.

4. The device of claim 3, said elements being in contact with said driven means when said elements are magnetized.

5. In a power transmission device, magnetizable driving means, magnetizable driven means, resilient material intermediate said driving and driven means and containing a plurality of elongated magnetizable elements having their long axes normally angularly disposed with relation to the axis of said driving and driven means, and means for producing a magnetic field substantially parallel with said axis and traversing said material and said magnetizable elements.

6. In a magnetic clutch, a magnetizable driving casing member, a magnetizable driving plate spaced therefrom, a core member joining said casing member and said plate, a magnetizing winding around said core member, a pad of resilient material attached to said plate and bringing surface areas of said plate and pad into contiguity in a plane substantially perpendicular to the axis of said clutch, a plurality of elongated magnetizable elements contained in said resilient material and aligned angularly with respect to said axis, and a magnetizable driven plate adjacent the opposite surface of said pad, said elements extending through said pad substantially from one said surface to the opposite surface thereof.

7. In a power transmission device, driving means, driven means, resilient material between said driving and driven means and containing a plurality of elongated magnetizable elements angularly disposed relative to the axis of said device, said elements normally being spaced from at least one of said means, and control means for magnetizing said elements to cause them to be in contact with both said driving and driven means to produce driving action between said driving and driven means, said control means being also adapted to cause effective demagnetization of said elements.

8. The device as described in claim 7, said elements being longer than the shortest distance between said driving and driven means.

9. In a power transmission device, magnetizable driving means, magnetizable driven means spaced therefrom, resilient material between said driving and driven means and containing a plurality of elongated wire-like elements normally spaced from at least one of said means adapted when magnetized to bridge the space between said driving and driven means, said elements being angularly disposed relative to the axis of said device, and controllable means for magnetizing said driving and driven means and said elements to produced driving action between said driving and driven means.

10. In a power transmission device, magnetizable driving means, magnetizable driven means spaced therefrom, resilient material between said driving and driven means and containing a plurality of elongated magnetizable elements normally spaced from at least one of said means adapted only when magnetized to bridge the space between said driving and driven means to cause driving action therebetween, said elements being angularly disposed relative to the axis of said device and normally not causing said driving action, and control means for causing magnetization of said driving and driven means and said elements, said control means being adapted also to cause effective demagnetization of said driving and driven means and said elements.

11. In a power transmission device, driving means including first magnetizable means, driven means including second magnetizable means, resilient material between said first and second magnetizable means and containing a plurality of elongated magnetizable elements angularly aligned relative to the axis of said device, said elements individually extending through the axial thickness of said resilient material, and means for magnetizing said magnetizable means and said elements, said magnetizing means producing magnetic flux tending to turn said elements into uniform alignment parallel with the axis of said device.

References Cited in the file of this patent
UNITED STATES PATENTS

| | | |
|---|---|---|
| 2,300,223 | Hottenroth | Oct. 27, 1942 |
| 2,532,876 | Asche et al. | Dec. 5, 1950 |
| 2,580,869 | Winther | Jan. 1, 1952 |
| 2,589,766 | Bernstein | Mar. 18, 1952 |
| 2,624,436 | Gamble | Jan. 6, 1953 |
| 2,804,184 | Bjork | Aug. 27, 1957 |